United States Patent [19]

Ferraro

[11] Patent Number: 5,327,879
[45] Date of Patent: Jul. 12, 1994

[54] COOKING APPARATUS WITH SUPPLEMENTAL HEAT SOURCE

[76] Inventor: Frank A. Ferraro, 104 Garwood Rd., Trumbull, Conn. 06611

[21] Appl. No.: 30,569

[22] Filed: Mar. 12, 1993

[51] Int. Cl.⁵ .................... A47J 37/00; F24C 3/00
[52] U.S. Cl. ..................... 126/41 R; 126/39 E; 431/344
[58] Field of Search ............ 126/41 R, 38, 39 R, 126/39 H, 39 I, 9 R; 431/344, 345, 346

[56] References Cited

U.S. PATENT DOCUMENTS

| | | | |
|---|---|---|---|
| 1,271,796 | 7/1918 | Stivers et al. | 126/41 R |
| 2,832,331 | 4/1958 | Schwank | 126/41 R |
| 3,140,740 | 7/1964 | Lagreid et al. | 431/344 |
| 3,576,987 | 5/1971 | Voight et al. . | |
| 3,704,309 | 11/1972 | Maulding . | |
| 3,781,329 | 12/1973 | Bollyky . | |
| 3,816,326 | 6/1974 | Bollyky . | |
| 3,943,910 | 3/1976 | White | 126/41 R |
| 3,978,844 | 9/1976 | Wilkins | 126/38 |
| 4,061,910 | 12/1977 | Rosenfeld . | |
| 4,276,017 | 6/1981 | Julien | 431/344 |
| 4,379,320 | 4/1983 | Mohan . | |
| 4,508,642 | 4/1985 | World . | |
| 4,795,439 | 1/1989 | Guest . | |
| 4,832,595 | 5/1989 | Eads | 431/344 |
| 4,865,081 | 9/1989 | Neumann et al. . | |
| 4,886,045 | 12/1989 | Ducate et al. | 126/41 R |
| 5,133,248 | 7/1992 | Farnsworth et al. | 126/41 R |
| 5,203,317 | 4/1993 | James | 126/41 R |

Primary Examiner—James C. Yeung
Attorney, Agent, or Firm—Galgano & Burke

[57] ABSTRACT

A supplemental heater is provided for use with a conventional cooking unit, such as an outdoor gas barbecue. One embodiment comprises a flexible hose which is linked to a conventional combustible fuel tank with an adapter. The other end of the hose is connected to the supplemental hand-held heater. The supplemental heater may also comprise a selectively controllable mechanism for igniting the combustible fuel and for controlling the flow of gas through the supplemental heater. The supplemental heater is designed for supplying additional heat to the items which are cooking on a grill of the main cooking unit.

8 Claims, 5 Drawing Sheets

COOKING APPARATUS WITH SUPPLEMENTAL HEAT SOURCE

The present invention is directed to a cooking apparatus and, more particularly, to a cooking apparatus comprising a selectively movable, supplemental heat source.

BACKGROUND OF THE INVENTION

Most conventional cooking apparatus, such as outdoor gas grills, comprise a grill adapted to support at least one food item, and a source of heat which is mounted a fixed distance from, typically below, the grill. The heat generated at the heat source typically does not provide uniform heating over the entire cooking surface of the grill. Burners for outdoor barbecue grills are usually configured in an H-shape which provides uneven heat distribution to food items spread across the grill. Non-uniform heating results in non-uniform cooking of the food items unless those items are moved to a different area on the grill during cooking.

It would therefore be desirable to provide a way of supplying supplemental heat to the food items located on portions of the grill which typically receive less heat.

It would also be desirable to provide a person cooking with greater flexibility and control over the amount of heat supplied to food items being cooked.

It would further be desirable, in certain applications, to provide the person cooking with the ability to accelerate the cooking process with a supplemental heat supply applied to the top surface of food items while a fixed heat source is cooking the bottom.

SUMMARY OF THE INVENTION

One embodiment of the present invention comprises a cooking apparatus having a first heat source, a cooking surface adapted to support an edible food item, and a supplemental heat source which is freely and selectively movable in a region proximate the food support in order to allow the supplemental heating of the edible item with the supplement heat source.

One preferred embodiment of the present invention comprises a gas outdoor barbecue. As with conventional outdoor barbecues, this embodiment comprises a source of gaseous fuel in fluidic communication with at least one burner. The burner is disposed below a grill adapted to support food items. A hand-held supplemental burner is also connected to the fuel supply tank. The supplemental heater of this embodiment comprises a hand-held burner unit having an actuator and a flared nozzle. The actuator controls the flow of gas to the nozzle and is also operatively connected to an ignitor for igniting the gaseous fuel. The supplemental, hand-held heater is connected to the fuel tank with a flexible hose of suitable length which allows a person cooking to selectively apply heat to food items when cooking on the grill.

These and other embodiments are described in further detail below.

DETAILED DESCRIPTION

The various embodiments of the present invention provide a source of supplemental heat which can be applied to a food item which is usually already cooking. Though the illustrated embodiment of the present invention is in the form of an outdoor, gas barbecue, other forms of cooking appliances such as indoor barbecues, and electric or gas stoves will enjoy the advantages of and are within the scope of the present invention.

Figure 1:
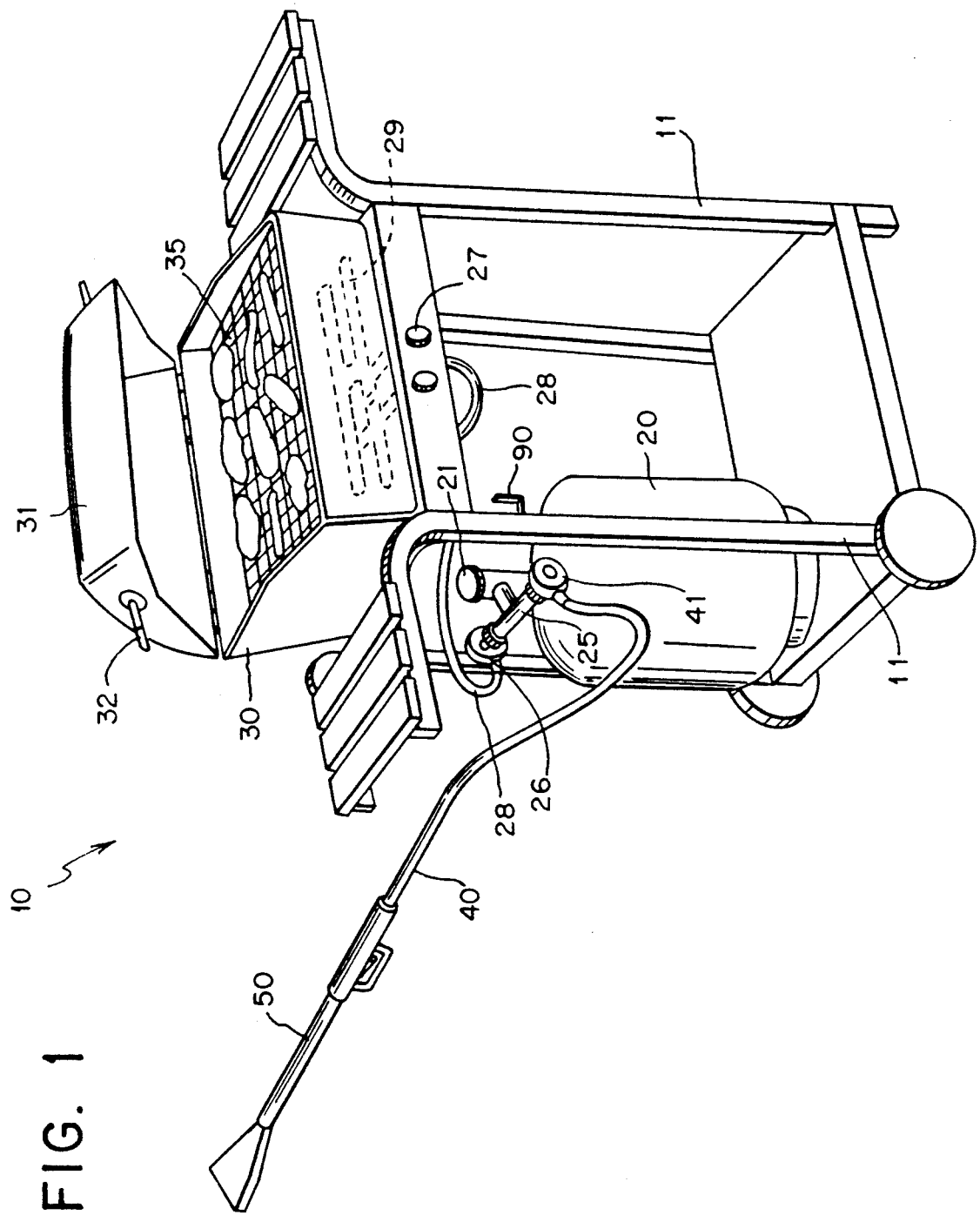
FIG. 1 is a perspective view of an outdoor barbecue embodiment of the present invention.

The illustrated embodiment of the present invention shown in FIG. 1 is in the form of outdoor, gas barbecue 10. Barbecue 10 comprises a source of fuel in the form of a gas supply tank 20 having a control valve 21. As with conventional gas barbecues, the control valve is advantageously adapted to control the flow of all gas from gas supply tank 20. Those skilled in the art will appreciate that the gas in gas tank 20 is typically directed to burners 29 (shown in phantom) positioned in the lower, interior portion of the cooker housing 30. A suitable gas conduit 28, e.g. a pipe, a flexible hose, or combination thereof, is typically used, along with a pressure regulator 26, to carry gas from gas supply tank 20 to the burners 29. As with conventional outdoor barbecues, the flow of gaseous fuel to stationary burners 29 is modulated by control valves 27.

According to the illustrated embodiment of the present invention, gas supply tank 20 supplies gas not only to the burners 29 in cooker housing 30 but also to supplemental heater 50. In order to maximize flexibility in the use of supplemental heater 50 while retaining proper safety standards, supplemental heater 50 is supplied with fuel from tank 20 via a suitable flexible hose 40 and a suitable pressure regulator 41.

Figure 5:
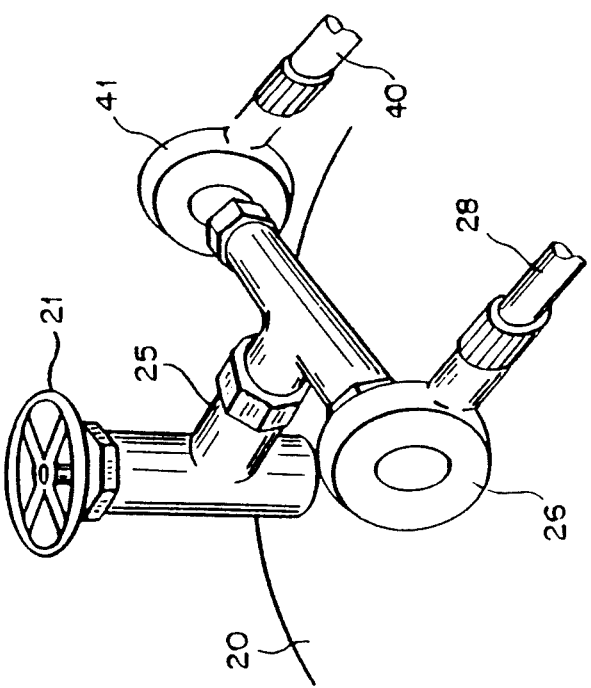
FIG. 5 is a perspective view of a dual output adapter of one embodiment of the present invention.
Figure 6:
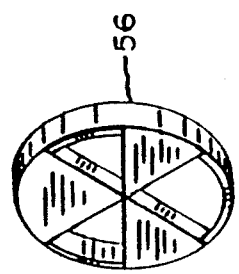
FIG. 6 is a perspective view of the two flame diverters shown in FIG. 3.
Figure 7:
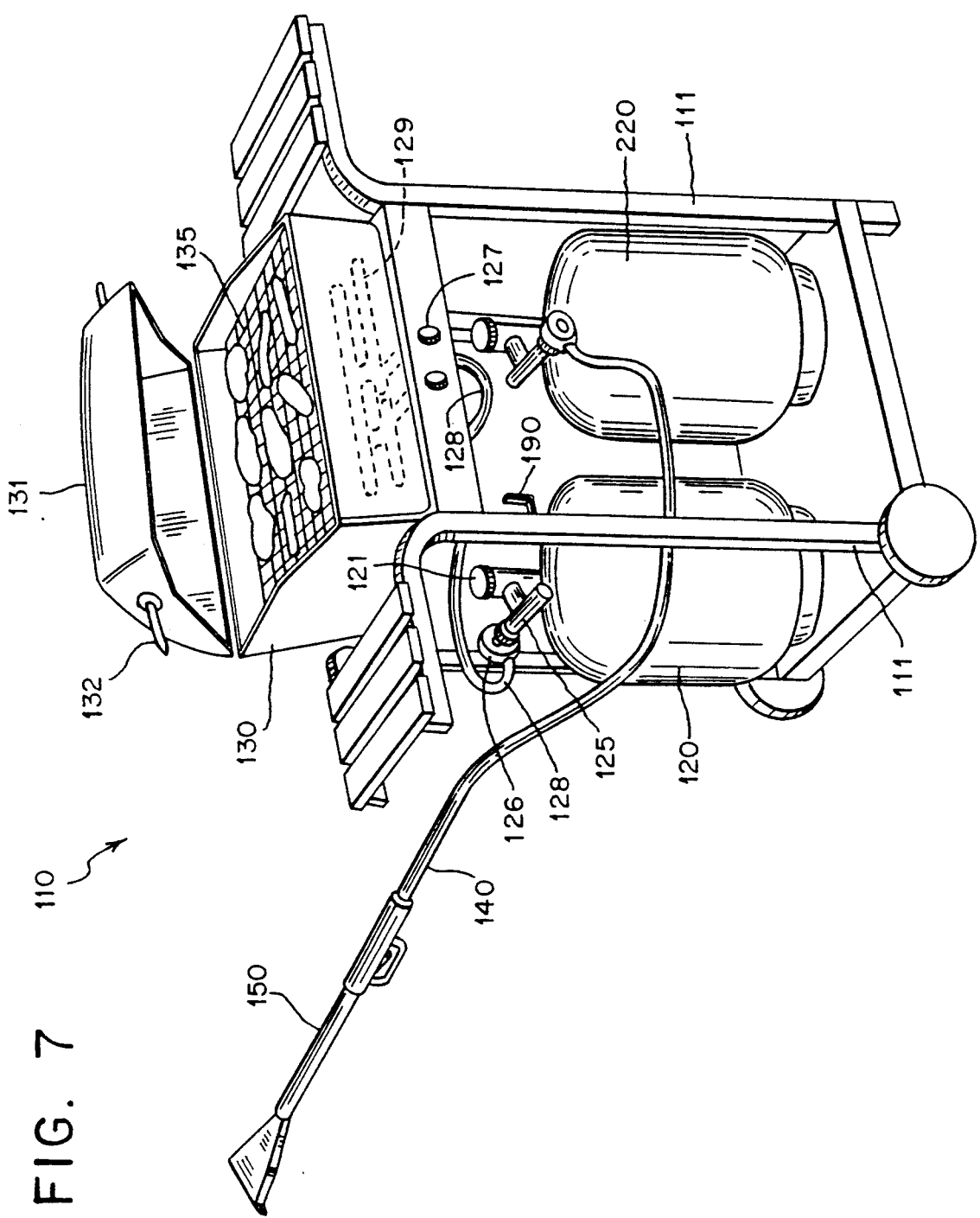
FIG. 7 is a perspective view of an alternative embodiment of the present invention.

The use of a single gas supply tank 20 to supply fuel to the primary burners 29 and supplemental heater 50 provides a less expensive alternative compared to providing a second gas supply tank for the supplemental heater 50 such as gas supply tank 220 shown in the embodiment of FIG. 7. With reference to FIG. 5, a dual output connector 25 is provided in the illustrated embodiment in order to provide gas to the flexible gas conduit 28 supplying the stationary heater and conduit 40 supplying supplemental heater 50. The dual output connector 25 of the illustrated embodiment is preferably designed to fit the outlets of standard propane tanks commonly used with outdoor barbecues. Thus, those skilled in the art will appreciate that an existing outdoor barbecue can readily be adapted to use a supplemental heater of the present invention by simply disconnecting the single existing gas conduit which supplies the burner units and attaching a dual output connector such as the connector 25 illustrated in FIG. 5. The regulator/conduit assemblies of both the supplemental heater 50 and burner 29 are then connected to connector 25. Thought the illustrated dual output connector 25 is adapted to be threadably connected to separate regulator/conduit assemblies, it will be appreciated by those skilled in the art that these elements could readily be formed as a single assembly.

Figure 2:
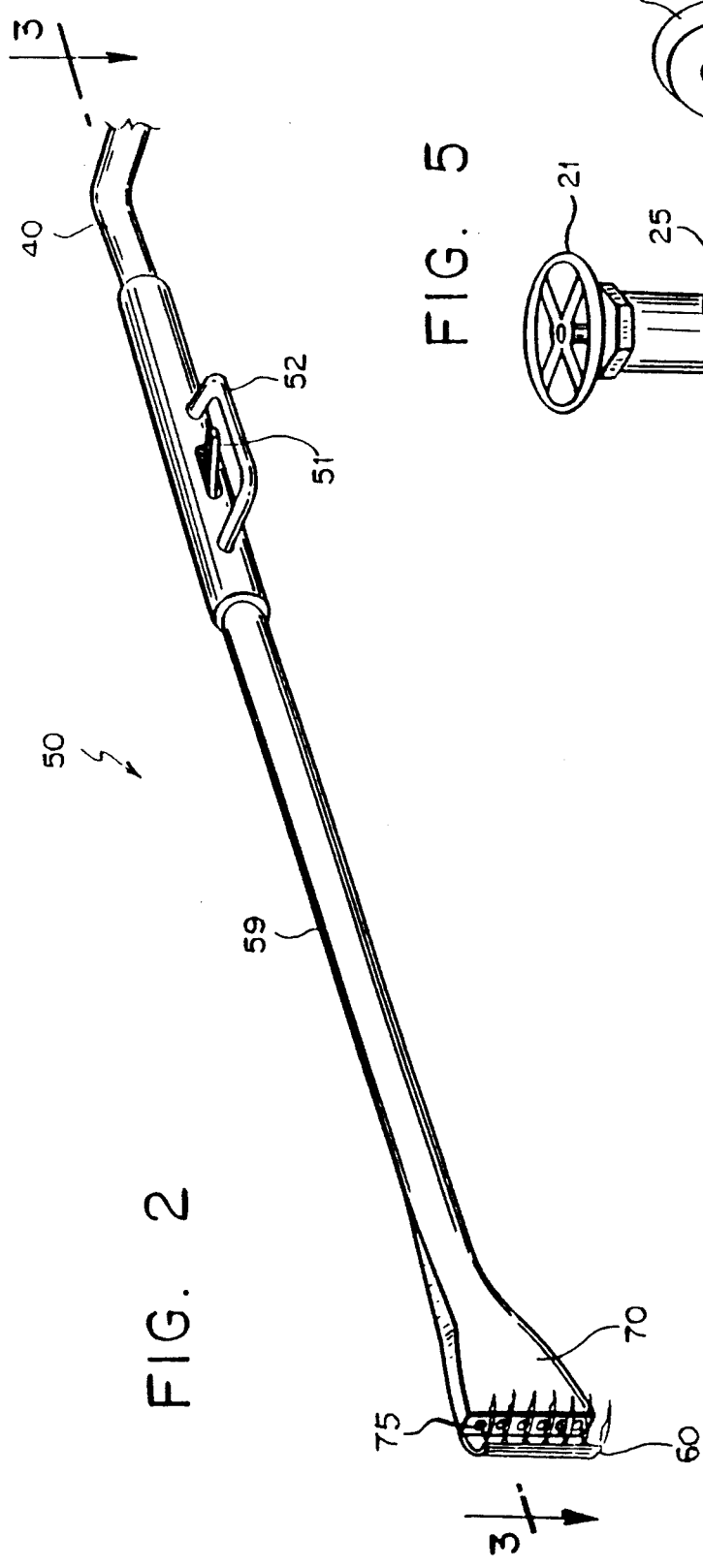
FIG. 2 is a bottom, perspective view of the supplemental heating unit illustrated in FIG. 1.
Figure 3:
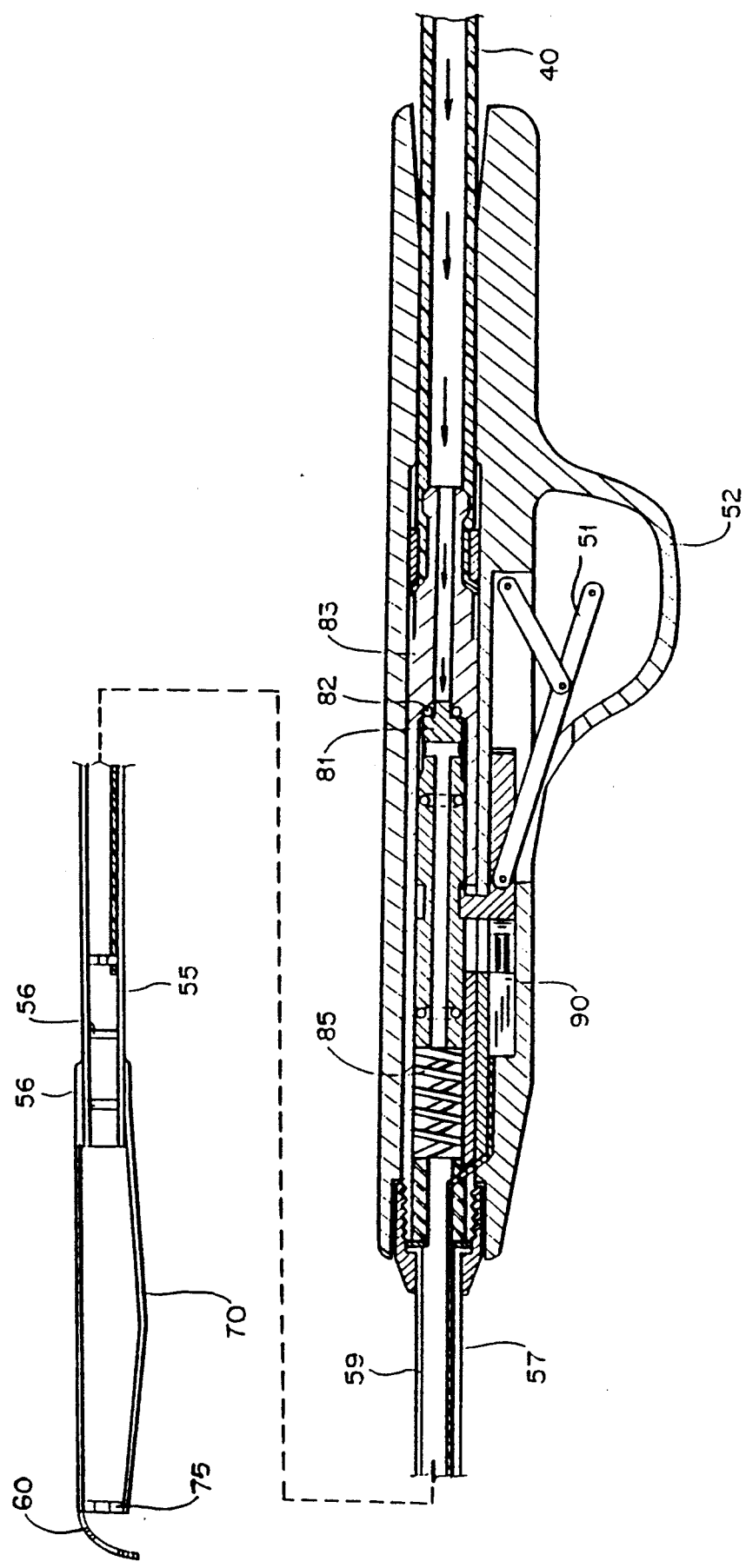
FIGS. 3 and 4 are cross-sectional side views taken along lines 3—3 of FIG. 2, illustrating different positions of the trigger.
Figure 4:
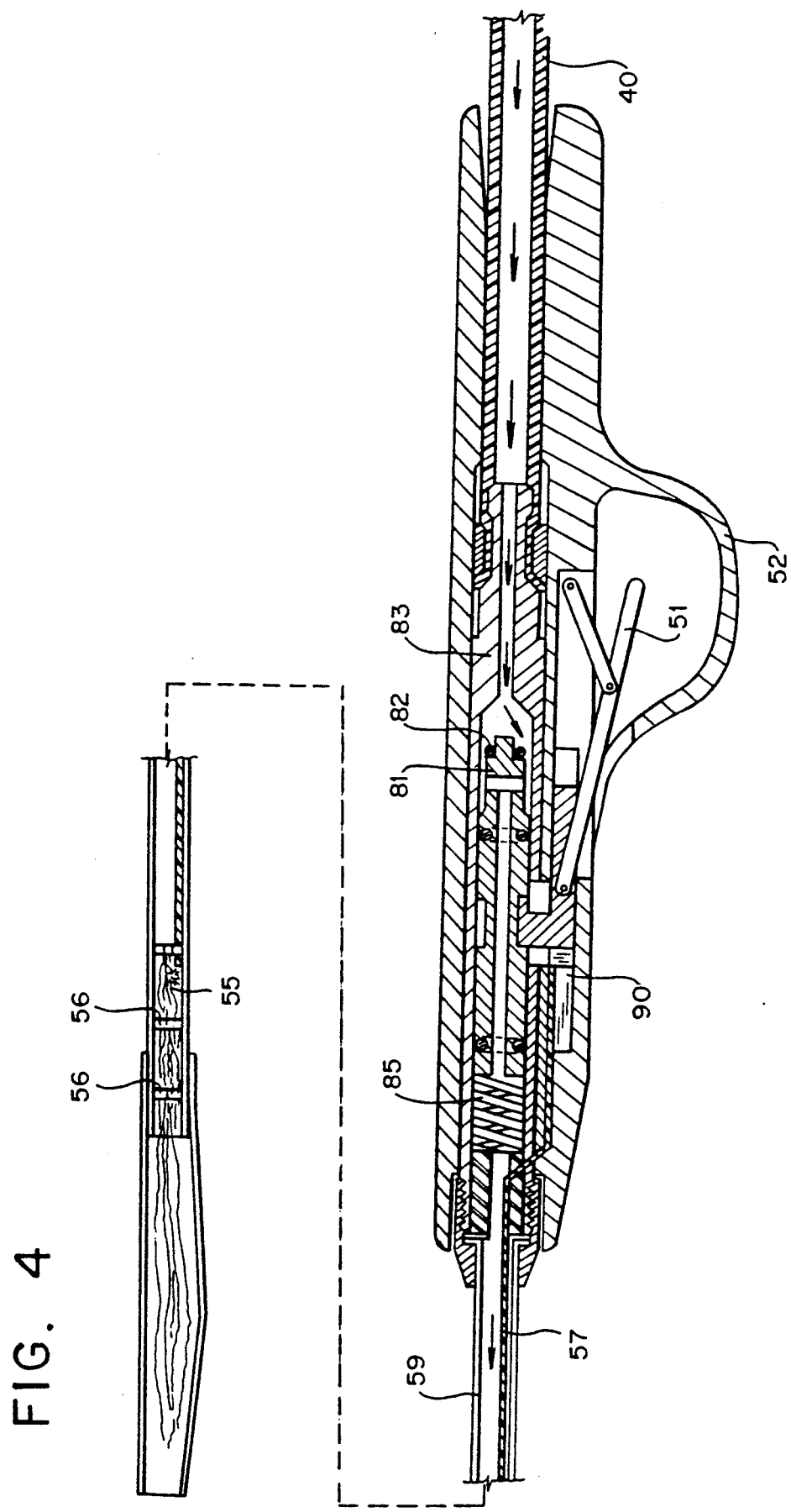

According to the illustrated embodiment shown more clearly in FIGS. 2-4, supplemental heater 50 comprises a hollow extension, a control mechanism for controlling the flow of gas, an ignitor 90 for igniting the gas at the proximal end thereof, and a nozzle 70 for directing the heat generated by the heater 50. The design of the supplemental heater 50 can vary widely within the scope of the present invention. The illustrated embodiment shown in FIGS. 2-4 is merely illustrative and is not intended to limit the scope of the present invention.

The length of flexible conduit 40 is sufficient to enable a person cooking to reach all sections of grill 35 with the nozzle end of supplemental heater 50. The details of the illustrated supplemental heater 50 are shown more clearly in FIGS. 3 and 4. The control section of supplemental heater 50 comprises a trigger 51 which is protected against inadvertent activation by a trigger guard 52. According to the preferred, illustrated embodiment of the present invention, trigger 51 is operatively linked to a spring biased flow control valve. The gas flow control valve comprises a stem 81 having a resilient seal 82 which are normally biased against a complementary intake tube 83 by a valve spring 85 in order to prevent the flow of gas into supplemental heater 50 when trigger 51 is in its normal, unactuated position. When trigger 51 is actuated by the squeezing of trigger 51, stem 81 and resilient seal 82 are moved away from the opening of intake tube 83 and gas is permitted to flow into supplemental heater 50. Those skilled in the art will appreciate that simpler valve arrangements may also be utilized without departing from the scope of the invention. For example, a simple rotatable valve which permits gas to flow into supplemental heater 50 when opened could be employed.

Trigger 51 is also advantageously operatively connected to an ignitor 90 having an actuation pin 91 which, upon activation of the trigger 51, is depressed and generates a spark to ignite fuel in combustion chamber 55 located toward the nozzle end of supplemental heater 50. The illustrated igniting mechanism advantageously comprises a piezo electric spark generator, which upon depression of actuation pin 91 generates a charge which travels through an insulated, electrically conductive lead 57 emanating as a spark in combustion chamber 55. The igniting mechanism may comprise any type of ignitor now know or later developed.

The illustrated piezo electric spark generator is merely exemplary. Other forms of ignitors can readily be employed without departing from the scope of the present invention. For example, according to an alternative embodiment of the present invention which is not illustrated, the combustible gas emanating from the nozzle end of supplemental heater 50 can simply be ignited by an external ignitor such as a flint or a match. The ignitor may be also be generally of the type marketed by BERNZOMATIC ®, Medina, New York for use with soldering torches. Alternatively, the igniting mechanism can be provided as a separate button which is not linked with the gas flow control valve. Various types of push bottom gas ignitors are well known in the art.

Thus, in operation, when trigger 51 is actuated, combustible fuel is permitted to flow through the handle section, through an orifice and into combustion chamber 55 where a spark from the igniting mechanism ignites the fuel. In the illustrated embodiment, the ignited fuel then passes through two flame diverters 56 which comprise non-aligned passages requiring the flame to follow a tortuous path to the nozzle outlet.

The nozzle end of the illustrate combustion chamber is provided with at least one orifice 75 which provides the ignited fuel with a point of egress from combustion chamber 55. While a single exit orifice can be provided in the nozzle section of supplemental heater 50, a plurality of nozzle orifices 75 can be used to provide a more evenly distributed flame resulting in a more evenly directed heat. The nozzle can also be angled downwardly such that the flames emanating from orifices 75 are directed downwardly toward the edible items receiving supplemental heat. A flame guard 60 also serves to direct the heat from the flames downwardly while preventing the flames from rising directly from the orifices 75 toward the person cooking. The supplemental heater of the present invention is preferably designed to cook food items with the heat exiting orifices 75 and not by direct flame contact.

Handle extension 59 may be made of any suitable material, such as a heat resistant metal, and may be of any suitable length. Since the nozzle portion and handle extension will be operated over the heat produced by the main cooking unit, the material utilized in their construction should withstand such heat. It is desirable that handle extension 59 by of suitable length to prevent the handle portion of supplemental heater 50 from becoming hot during use. For example, handle extension 59 may be about 12-15 inches in length.

Flexible hose 40 can be provided with different lengths for use with different heating units. For example, the flexible hose 40 illustrated in FIG. 1 is a length of about 2-3 feet which allows the supplemental heater 50 to reach all portions of the grill 35.

According to another aspect of the invention, a conversion kit is provided for use with a pre-existing cooking unit. The kit comprises an attachment member for connecting the supplemental heater with a source of energy, for example, combustible gas or electricity. If, for example, the conversion kit is intended for use with an outdoor gas barbecue, the conversion kit can simply comprise the dual output connector 25, flexible hose 40, pressure regulator 41 and supplemental heater 50 illustrated in FIG. 1. As an optional accessory, such a conversion kit could also be provided with a bracket 90 which is mountable on the support structure 11 of a conventional grill thereby providing a place to hang the supplemental heater when it is not in use. Such a conversion kit will allow the enjoyment of the benefits of the present invention without discarding a pre-existing outdoor barbecue.

Those skilled in the art will appreciate that the advantages of the present invention can also be enjoyed with barbecue grills having more than one stationary heater. For example, recently barbecue grills have been marketed with small burners located slightly remote from the primary burners for heating additional items, e.g. pots of vegetables.

The various embodiments of cooking apparatus and kit of the present invention may be used to provide supplemental grilling to the tops and sides of one or more food items cooking on a conventional grill.

We claim:

1. A portable gas barbecue cooking apparatus comprising:
   a first heat source comprising an open flame;

at least one portable supply of combustible gas comprises a gas-supply cutoff valve;

a gas conduit connecting said first heat source with said portable supply of combustible gas;

a grill adapted to support an edible item over said first heat source; and a hand-held supplemental heat source connected to a portable source of combustible gas with a flexible conduit, said supplemental heat source comprising:

a flame chamber wherein combustible gas is ignited, said flame chamber comprising a gas inlet and a hot gas outlet;

means for regulating the flow of combustible gas into said flame chamber;

means for directing hot gases from said hot gas outlet of said flame chamber directly onto an edible item, said directing means comprising an open gas outlet;

wherein said open gas outlet of said supplemental heat source is selectively movable, both horizontally and vertically, in a region proximate said grill thereby allowing a person cooking to supply hot gases directly to an edible item on said grill.

2. A cooking apparatus according to claim 1 wherein said supplemental heat source further comprises means for igniting said combustible gas.

3. A cooking apparatus according to claim 2 wherein said igniting means comprises means for generating a spark.

4. A cooking apparatus according to claim 2 wherein said igniting means comprises a piezo electric spark generator.

5. A cooking apparatus according to claim 2 further comprises means for controlling the flow of combustible gas through said supplemental heat source, wherein said controlling means is linked to said igniting means such that said igniting means is activated when combustible gas is initially allowed to flow through said supplemental heat source.

6. A cooking apparatus according to claim 1 wherein said first heat source is fixed relative to said grill.

7. A cooking apparatus according to claim 1 wherein both of said heat sources are supplied with a combustible fuel from a common source.

8. A cooking apparatus according to claim 1 wherein said first heat source and said supplemental heat source are supplied with a combustible fuel from separate sources.

* * * * *